(12) United States Patent
Fujioka (10) Patent No.: US 10,476,090 B2
(45) Date of Patent: Nov. 12, 2019

(54) FUEL CELL SYSTEM

(71) Applicant: TOYOTA JIDOSHA KABUSHIKI KAISHA, Toyota-shi, Aichi-ken (JP)

(72) Inventor: Hisaya Fujioka, Aichi-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 81 days.

(21) Appl. No.: 15/812,148

(22) Filed: Nov. 14, 2017

(65) Prior Publication Data
US 2018/0145355 A1 May 24, 2018

(30) Foreign Application Priority Data

Nov. 21, 2016 (JP) .................. 2016-226199
Jun. 15, 2017 (JP) .................. 2017-117881

(51) Int. Cl.
| | |
|---|---|
| *H01M 8/04* | (2016.01) |
| *H01M 8/04701* | (2016.01) |
| *B60L 50/72* | (2019.01) |
| *H01M 8/04029* | (2016.01) |
| *H01M 8/04007* | (2016.01) |
| *H01M 8/0432* | (2016.01) |
| *H01M 8/04664* | (2016.01) |
| *H01M 8/04746* | (2016.01) |
| *B60L 50/71* | (2019.01) |

(52) U.S. Cl.
CPC ........ *H01M 8/04723* (2013.01); *B60L 50/72* (2019.02); *H01M 8/04029* (2013.01); *H01M 8/04067* (2013.01); *H01M 8/04358* (2013.01); *H01M 8/04686* (2013.01); *H01M 8/04768* (2013.01); *B60L 50/71* (2019.02)

(58) Field of Classification Search
CPC ......... H01M 8/04358; H01M 8/04723; B60L 50/71; B60L 50/72

USPC ....................................................... 429/437
See application file for complete search history.

(56) References Cited

U.S. PATENT DOCUMENTS

2011/0177416 A1* 7/2011 Suematsu ......... H01M 8/04029
                                                                429/440

FOREIGN PATENT DOCUMENTS

| JP | 2003-168454 | 6/2003 |
|---|---|---|
| JP | 2005-285489 | 10/2005 |
| JP | 2014-58931 | 4/2014 |

* cited by examiner

*Primary Examiner* — Bryan D. Ripa
*Assistant Examiner* — James M Erwin
(74) *Attorney, Agent, or Firm* — Finnegan, Henderson, Farabow, Garrett & Dunner, LLP (57) ABSTRACT

A fuel cell system includes: a first temperature sensor that measures the temperature of cooling water on the side of a cooling water outlet of a fuel cell; a second temperature sensor that measures the temperature of the cooling water on the side of a cooling water inlet of a water heater for heating the cooling water; a third temperature sensor that measures the temperature of the cooling water on the side of a cooling water outlet of the water heater; a cooling water pump that circulates the cooling water; and a control device. The control device is configured to determine that there is a cooling water leakage when the condition: "measurement temperature T1 measured by the first temperature sensor≠measurement temperature T2 measured by the second temperature sensor" or the condition "no temperature difference ΔT between measurement temperature T2 and measurement temperature T3 measured by the third temperature sensor" is met.

5 Claims, 5 Drawing Sheets

FUEL CELL SYSTEM

CROSS-REFERENCES TO RELATED APPLICATIONS

This application relates to and claims priority from Japanese Patent Application Nos. JP2016-226199, filed on Nov. 21, 2016, and JP2017-117881, filed on Jun. 15, 2017, the entire disclosures of which are incorporated herein by reference.

BACKGROUND

Field

The present invention relates to a fuel cell system.

Description of Related Art

Some conventional fuel cell systems detect a leakage of cooling water due to a failure of a radiator, etc., based on variations in the amount of electric power used by a cooling water pump. Furthermore, a disclosed technique teaches that the shortage of cooling water in a fuel cell system can be detected from the rotation speed of a cooling water circulation pump and an abnormal result of measurement at liquid temperature sensors disposed at the cooling water inlet and outlet of a power generation source (see, for example, JP2014-058931 A).

SUMMARY

It is, however, difficult to identify cooling water leakage due to a failure of a radiator, etc., at an early stage.

In view of the above circumstances, it is an object of the present invention to provide a fuel cell system capable of identifying a leakage of cooling water due to a failure of a radiator, etc., at an early stage.

According to an aspect of the present invention, a fuel cell system including a fuel cell is provided which comprises: a first temperature sensor that measures the temperature of cooling water on a cooling water outlet side of the fuel cell; a second temperature sensor that measures the temperature of the cooling water on a cooling water inlet side of a water heater that heats the cooling water; a third temperature sensor that measures the temperature of the cooling water on a cooling water outlet side of the water heater; a cooling water pump that circulates the cooling water; and a control device that controls the driving of the cooling water pump and the water heater by receiving measurement values from the first, second and third temperature sensors, wherein the water heater and the second and third temperature sensors are arranged above in the direction of gravity relative to the cooling water pump and the first temperature sensor, and wherein the control device is configured to determine that a cooling water leakage occurs when a measurement temperature T1 measured by the first temperature sensor is not equal to a measurement temperature T2 measured by the second temperature sensor, or when the measurement temperature T2 and a measurement temperature T3 measured by the third temperature sensor have no temperature difference $\Delta T$ therebetween.

In the above fuel cell system, if cooling water leaks out and its water level goes down below the water heater, no cooling water exists between the first and second temperature sensors and a temperature difference is generated therebetween, and accordingly, a cooling water leakage can be determined by detecting the presence/absence of such temperature difference. Furthermore, if no cooling water exists in portions upstream and downstream of the water heater along the direction in which the cooling water flows, the heat of a heat-generating member is not transferred and remains in the member, i.e., such heat of the heat-generating member does not flow, although it warms the air in the pipe, and accordingly, no temperature difference $\Delta T$ is generated between the measurement temperatures T2 and T3. Thus, a cooling water leakage can be detected by detecting the presence/absence of such temperature difference.

In the above fuel cell system, the control device may be configured to: drive the cooling water pump at a higher rotation speed when the measurement temperature T1 is not equal to the measurement temperature T2 or when the measurement temperature T2 and the measurement temperature T3 have no temperature difference $\Delta T$ therebetween; and to determine that the cooling water is at a water level which is lower than the water heater but higher than the fuel cell and the cooling water pump, when the measurement temperature T1 is equal to the measurement temperature T2 or the measurement temperatures T2 and T3 have a temperature difference $\Delta T$ therebetween.

The fuel cell system may further include a radiator for the cooling water and a fourth temperature sensor that measures the temperature of the cooling water on a cooling water outlet side of the radiator, and the control device may be configured to: drive the cooling water pump at a higher rotation speed when the measurement temperature T1 is not equal to the measurement temperature T2 or when the measurement temperature T2 and the measurement temperature T3 have no temperature difference $\Delta T$ therebetween; and to determine that the cooling water is at a water level which is lower than the cooling water pump, when the measurement temperature T1 is not equal to the measurement temperature T2 and the measurement temperatures T2 and T3 have no temperature difference $\Delta T$ therebetween, and when the measurement temperature T1 is not equal to a measurement temperature T4 measured by the fourth temperature sensor.

The fuel cell system may further include a radiator for the cooling water and a fourth temperature sensor that measures the temperature of the cooling water on a cooling water outlet side of the radiator, and the control device may be configured to: drive the cooling water pump at a higher rotation speed when the measurement temperature T1 is not equal to the measurement temperature T2 or when the measurement temperature T2 and the measurement temperature T3 have no temperature difference $\Delta T$ therebetween; and to stop power generation by the fuel cell when the measurement temperature T1 is not equal to the measurement temperature T2 and the measurement temperatures T2 and T3 have no temperature difference $\Delta T$ therebetween, and thereafter determine that the water level of the cooling water is zero when the measurement temperature T1 is not equal to a measurement temperature T4 measured by the fourth temperature sensor.

The fuel cell system may further include a radiator for the cooling water and a fourth temperature sensor that measures the temperature of the cooling water at a cooling water outlet of the radiator, and the control device may be configured to: drive the cooling water pump at a higher rotation speed when the measurement temperature T1 is not equal to the measurement temperature T2 or when the measurement temperatures T2 and T3 have no temperature difference $\Delta T$ therebetween; and to determine that the water level of the cooling water is zero when the measurement temperature T1 is not equal to the measurement temperature T2 and the measurement temperatures T2 and T3 have no temperature difference ΔT therebetween, and when the measurement temperature T1 is equal to a measurement temperature T4 measured by the fourth temperature sensor.

DETAILED DESCRIPTION

Hereinafter, preferred embodiments of the present invention will be described with reference to the attached drawings. In the drawings, elements/components with the same reference numeral have the same or similar functions.

First Embodiment

Figure 1:
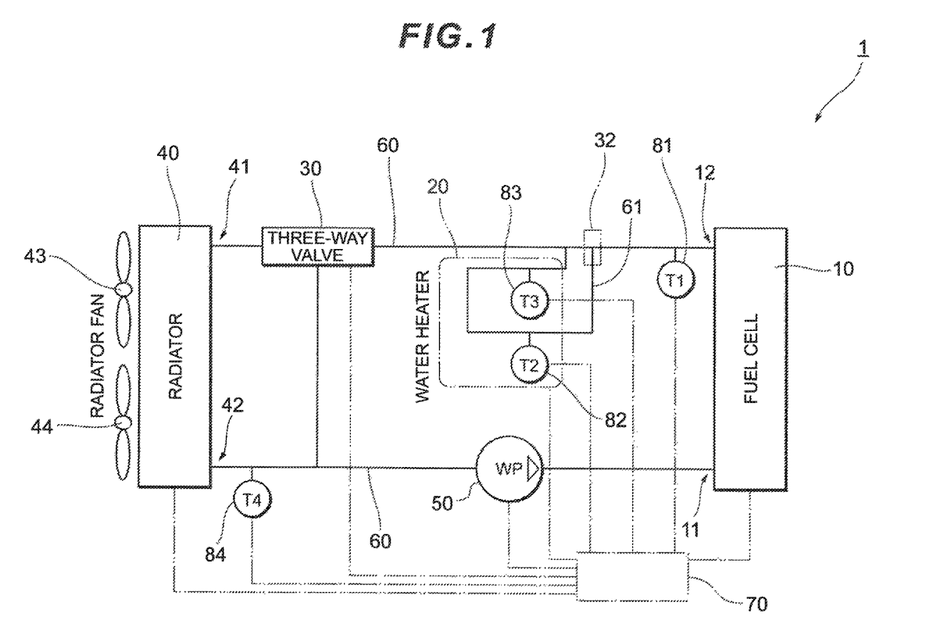
FIG. 1 is an illustration showing the schematic configuration of a fuel cell system.

A fuel cell system 1 includes, for example, a fuel cell 10, a water pipe 60 through which cooling water for the fuel cell 10 flows, a radiator 40 provided on the water pipe 60, a bypass 62 of the water pipe 60, a three-way valve 30 provided on the water pipe 60, a cooling water pump 50 also provided on the water pipe 60, and a computer (control device) (see FIG. 1). Such fuel cell system 1 according to the present embodiment further includes, for example, a water heater 20, a first temperature sensor 81, a second temperature sensor 82, a third temperature sensor 83, and a fourth temperature sensor 84 (see FIG. 1).

The bypass 62 is a flow path that bypasses the water pipe 60 and is branched from the water pipe 60 at a position upstream of the radiator 40. The flow rate of the cooling water flowing toward the radiator 40 and the flow rate of the cooling water flowing toward the bypass 62 can be adjusted by using the three-way valve 30.

The water heater 20 is a heater arranged at a position on the water pipe 60 downstream of the fuel cell 10. The water heater 20 is used to heat the cooling water. Alternatively, a branched pipe 61 for the heating of water may be provided for the water pipe 60, and a water heater 20 may be provided on such branched pipe 61 (see FIG. 1). In such a case, a three-way valve 32 may be provided at the branched portion so as to be used to supply cooling water to the branched pipe 61 and to the water heater 20 only when needed. The water heater 20 is disposed above in the direction of gravity (i.e., the vertical direction) relative to the fuel cell 10 and the cooling water pump 50 (see FIG. 2).

The radiator 40 is an air-cooling device that removes heat of the cooling water with radiator fans 43 and 44. In FIG. 1, reference numeral 41 indicates a cooling water inlet of the radiator 40.

The cooling water pump 50 is a pump for circulating the cooling water by applying pressure to the cooling water. The arrangement of the cooling water pump 50 is not particularly limited, and the cooling water pump 50 in the present embodiment is arranged at a position on the water pipe 60 between a cooling water outlet 42 of the radiator 40 and a cooling water inlet 11 of the fuel cell 10 (see FIG. 1). It should be noted here that the cooling water pump 50 in the present embodiment is arranged at an almost equal level to the fuel cell 10.

Each of the temperature sensors 81-84 is a sensor that measures the water temperature of the cooling water, which is circulating through the fuel cell system 1, at a specified position.

The first temperature sensor 81 is a sensor that measures the temperature of the cooling water on the side of a cooling water outlet 12 of the fuel cell 10.

The second temperature sensor 82 is a sensor that measures the water temperature of the cooling water on the side of a cooling water inlet 21 of the water heater 20. With the use of such second temperature sensor 82, it is possible to measure the water temperature of the cooling water before it is heated by the water heater 20.

The third temperature sensor 83 is a sensor that measures the water temperature of the cooling water on the side of a cooling water outlet 22 of the water heater 20. With the use of such third temperature sensor 83, it is possible to measure the water temperature of the cooling water after it is heated by the water heater 20.

The fourth temperature sensor 84 is a sensor that measures the water temperature of the cooling water on the side of the cooling water outlet 42 of the radiator 40. With the use of such fourth temperature sensor 84, it is possible to measure the water temperature of the cooling water that has been cooled as a result of the passage through the radiator 40.

Figure 2:
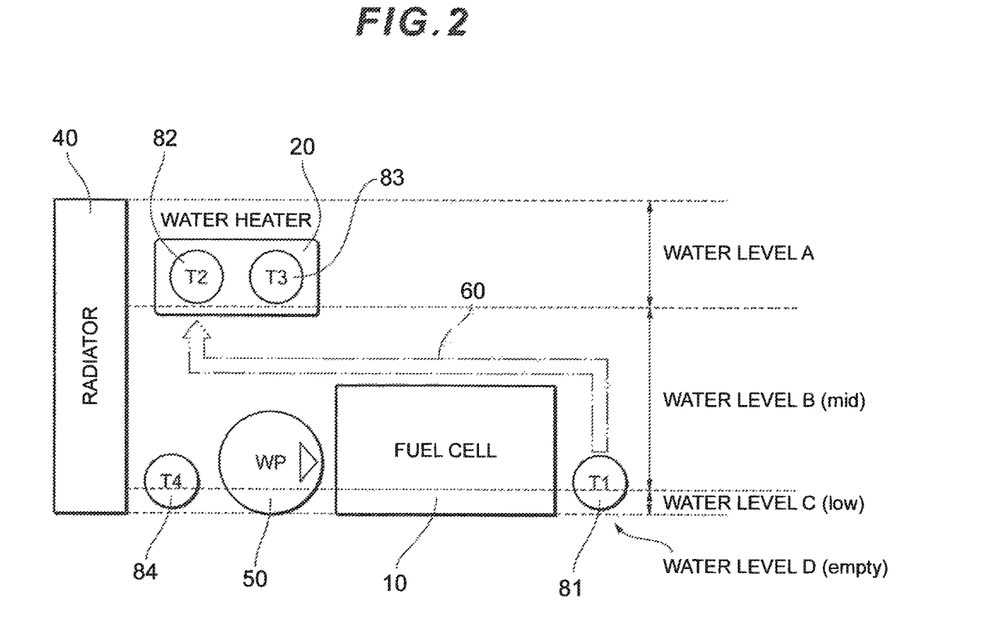
FIG. 2 is a side view of a fuel cell system, for explaining an example of the vertical arrangement of a water heater, a fuel cell, etc., in the fuel cell system, as well as an example of the water level of cooling water.

Similarly to the water heater 20, the second and third temperature sensors 82 and 83 in the present embodiment are disposed above in the direction of gravity relative to the cooling water pump 50, the first temperature sensor 81 and the fuel cell 10 (see FIG. 2).

The computer (control device) 70 performs control of the fuel cell 10, three-way valve 30, cooling water pump 50, and the like, according to the condition of operation. The computer 70 in the present embodiment receives water temperature measurements from the first, second, third and fourth temperature sensors 81, 82, 83 and 84 and thereby controls the driving of the cooling water pump 50 and the water heater 20 (see FIG. 1, etc.).

Figure 3:
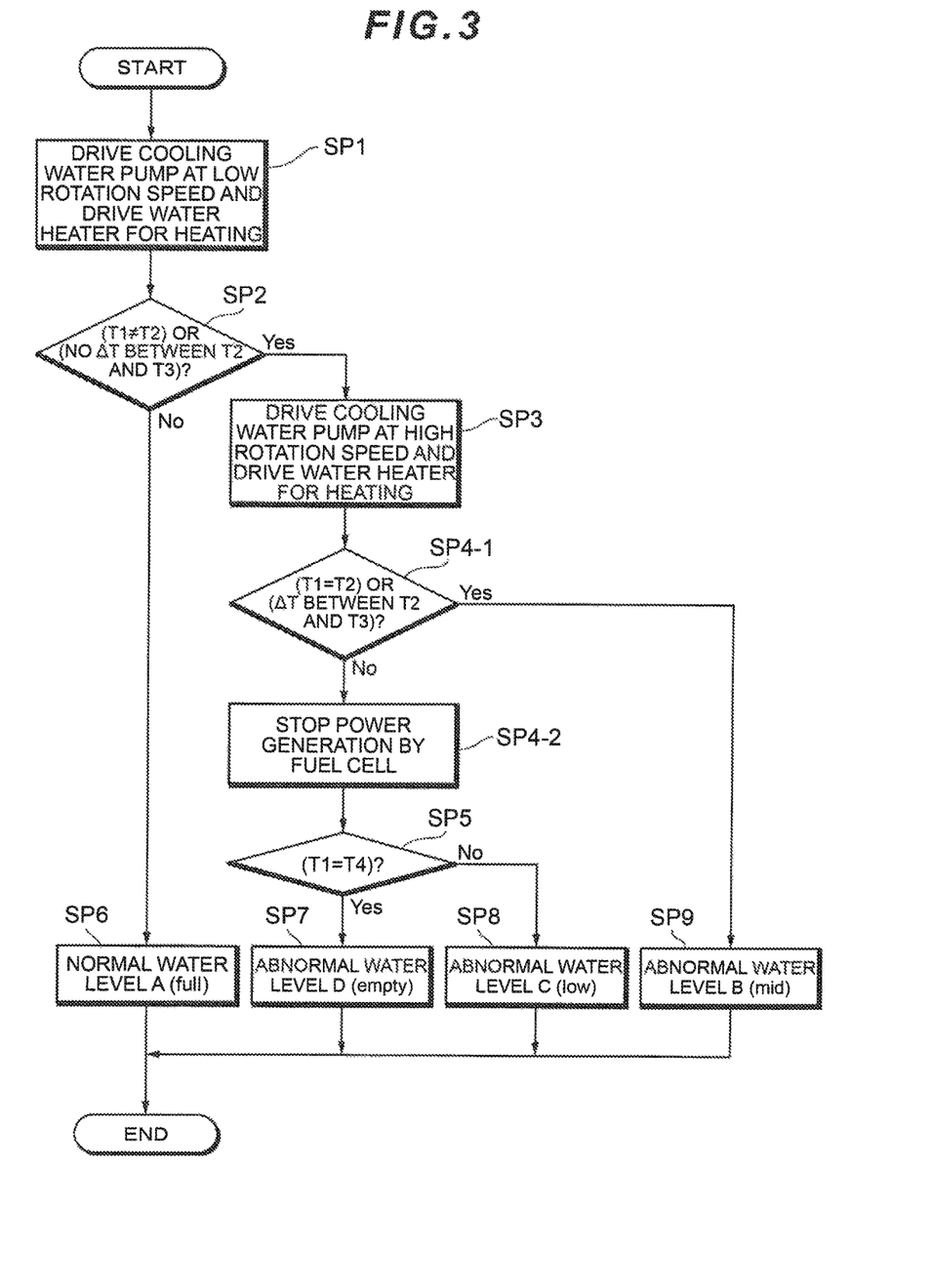
FIG. 3 is a flowchart showing an example of the process for determining the water level of the cooling water.

Next, the feature of detecting a cooling water leakage in the fuel cell system 1 according to the present embodiment will be described with reference to the flowchart shown in FIG. 3.

First, the outline of the detection of a cooling water leakage in the fuel cell system 1 will be briefly described. In the fuel cell system 1, if the cooling water leaks out so that the water level of the cooling water goes down below the water heater 20, no cooling water exists between the first temperature sensor 81 and the second temperature sensor 82 and this generates a temperature difference ΔT between the temperature T1 measured by the first temperature sensor 81 and the temperature T2 measured by the second temperature sensor 82. Accordingly, a cooling water leakage can be determined by detecting the presence/absence of such temperature difference. Furthermore, if no cooling water exists in portions upstream and downstream of the water heater 20 along the direction in which the cooling water flows, the temperature T2 measured by the second temperature sensor 82 and the temperature T3 measured by the third temperature sensor 83 have no temperature difference ΔT therebetween, and accordingly, a cooling water leakage can be detected by detecting the presence/absence of such temperature difference.

In the present embodiment, as a precondition for the detection of a cooling water leakage, the following four levels are set as the water level of the cooling water circulating through the fuel cell system 1 (see FIG. 2):

Normal water level A (full): a normal level which is above, or reaches, the level of the water heater 20;

Abnormal water level B (mid): an abnormal level which is below the level of the water heater 20;

Abnormal water level C (low): a further abnormal level which is below the level of the upper surface of the fuel cell 10 and also below the level of the upper portion of the cooling water pump 50; and Abnormal water level D (empty): a most abnormal level which is approximately zero.

A cooling water leakage is detected in the manner set out below. First, the cooling water pump 50 is driven at a low rotation speed and the water heater 20 is also driven for heating (the heater is turned on to heat the cooling water) (step SP1). The term "low rotation speed" as used herein means a rotation speed which is set based on the minimum flow rate necessary for the passage of the cooling water. In other words, such low rotation speed means the number of rotations when the cooling water is circulating under a weak force for pumping out the water. The rotation speed in the present embodiment has a value such that: the cooling water is circulating when there is a sufficient amount of cooling water with no leakage of the cooling water; whereas, the cooling water is not circulating if the amount of cooling water decreases due to a leakage of the cooling water.

Here, if either the condition: "measurement temperature T1 measured by the first temperature sensor 81≠measurement temperature T2 measured by the second temperature sensor 82" (if the water level of the cooling water is at or below level B, the cooling water does not flow into the water heater 20 and, accordingly, measurement temperature T2 measured by the second temperature sensor 82, which is not in contact with the cooling water, will be different from measurement temperature T1 measured by the first temperature sensor 81) or the condition: "no temperature difference ΔT between measurement temperature T2 and measurement temperature T3 measured by the third temperature sensor 83" is met (YES in step SP2), then the computer 70 determines that a cooling water leakage has occurred in the fuel cell system 1. In that case, the detection process goes to step SP3 onward, to determine the degree of the cooling water leakage.

On the other hand, if neither of the conditions: "measurement temperature T1 measured by the first temperature sensor 81≠measurement temperature T2 measured by the second temperature sensor 82" and "no temperature difference ΔT between measurement temperature T2 and measurement temperature T3 measured by the third temperature sensor 83" are met (NO in step SP2), then the computer 70 determines that no cooling water leakage occurs and that the water level is normal (Normal water level A) (step SPC), and ends the process for detecting a cooling water leakage.

In step SP3, the cooling water pump 50 is driven at a high rotation speed and the water heater 20 is also driven for heating (step SP3). The term "high rotation speed" as used herein means a rotation speed sufficient to deliver the heat generated in the fuel cell system 1 to the radiator 40. Such high rotation speed in the present embodiment is set to a rotation speed that enables the cooling water to flow. It should be noted here that, if an increase in the rotation speed of the cooling water pump 50 enables the cooling water to flow even though the cooling water contains air therein, the determination using the sensors can be performed with such flow of the cooling water.

When a predetermined period of time has passed after step SP3 (such time period is not particularly limited as long as the length of time is such that a certain temperature difference may occur between T2 and T3 due to the operation of the water heater 20), a judgment is made as to whether the condition "measurement temperature T1=measurement temperature T2" or the condition "temperature difference ΔT existing between measurement temperature T2 and measurement temperature T3" is met (step SP4-1). If the result of the judgment in step SP4-1 is YES, the computer 70 determines that the cooling water in the fuel cell system 1 is at abnormal water level B (mid) (step SP9) and ends the process for detecting a cooling water leakage. It should be noted here that such a temperature difference ΔT is generated between measurement temperatures T2 and T3 when the cooling water is pumped out due to a high rotation speed of the cooling water pump 50 and this indicates that abnormal water level B corresponds to the level at which the cooling water can be pumped out by the cooling water pump 50. If the result of the judgment in step SP4-1 is NO, the computer 70 stops power generation by the fuel cell 10 (step SP4-2) so as to create a state in which no heat-generating member is present between the fourth temperature sensor 84 and the first temperature sensor 81. The process then goes to step SP5.

In step SP5, a judgment is made as to whether the condition "measurement temperature T1=measurement temperature T4" is met. If the result of the judgment in step SP5 is YES, this indicates that there is no temperature difference ΔT between measurement temperatures T1 and T4. In the presence of water, water flows through the fourth temperature sensor 84 toward the first temperature sensor 81. Since the fuel cell 10, which is located between the first and fourth temperature sensors 81 and 84, is not generating heat, the temperature of the water is not raised in the fuel cell 10, resulting in measurement temperatures T1 and T4 being the same temperature. In light of these results, the computer 70 determines that the cooling water in the fuel cell system 1 is at abnormal water level C (low), which is lower than, for example, the level of the fuel cell 10 but allows the cooling water to flow (step SP8), and ends the process for detecting a cooling water leakage. Such abnormal water level C (low) is a level at which the cooling water pump 50 is able to pump out the cooling water, and this means that the cooling water can move from the fourth temperature sensor 84 to the first temperature sensor 81, resulting in measurement temperature T1 becoming the same temperature as measurement temperature T4 measured by the fourth temperature sensor 84.

On the other hand, if the result of the judgment in step SP5 is NO, this indicates that there is a temperature difference ΔT between measurement temperatures T1 and T4. In the absence of water, no water flows through the first temperature sensor 81 or the fourth temperature sensor 84. In such a case, measurement temperature T1 will be the temperature of the fuel cell (stack) 10 and measurement temperature T4 will be a temperature affected by thermal transfer from the piping in the body of the radiator 40, i.e., measurement temperatures T1 and T4 will be different temperatures. In light of these results, the computer 70 determines that the cooling water in the fuel cell system 1 is at abnormal water level D (empty) (step SP7), and ends the process for detecting a cooling water leakage. Such abnormal water level D (empty) is a water level at which no cooling water exists so that measurement temperatures T1 and T4 will just indicate the respective ambient temperatures.

According to the above-described fuel cell system 1 of the present embodiment, a cooling water leakage due to a failure of a radiator, etc., can be identified at an early stage, as compared to the conventional systems in which a cooling water leakage cannot be determined unless the system is in a condition where no cooling water flows through the cooling pump, i.e., cooling water leakage cannot be discovered until the cooling water is completely extracted out.

The above-described embodiment is presented to facilitate the understanding of, and not to limit, the present invention. Each element of the embodiment, as well as the arrangement, material, condition, shape, size, etc., thereof, are not limited to those described above, and may be modified as desired. Moreover, components described in different embodiments may be partly exchanged with each other or such components may be combined together.

For example, although the above-indicated embodiment describes an example in which the temperature sensors 82 and 83 are arranged at the cooling water inlet 21 and cooling water outlet 22 of the water heater 20, respectively, such arrangement at the cooling water inlet 21 and cooling water outlet 22 is just an example of the suitable arrangement of the temperature sensors. What is important and necessary to detect a cooling water leakage in the fuel cell system 1 is to detect a temperature difference of the cooling water between specific portions of the water pipe 60 (or branched pipe 61). The arrangement of the temperature sensors does not need to be strictly specified as long as the detection of a temperature difference can be achieved as set forth above.

Furthermore, the arrangement of the fuel cell 10, the cooling water pump 50, the first through fourth temperature sensors 81-84, etc., in the above-described embodiment is just an example, and even a fuel cell system 1 in which these elements are arranged at different levels from those in the above embodiment can be configured so as to be able to identify a cooling water leakage at an early stage in accordance with a similar mechanism and concept to those of the above embodiment.

Second Embodiment

Figure 4:
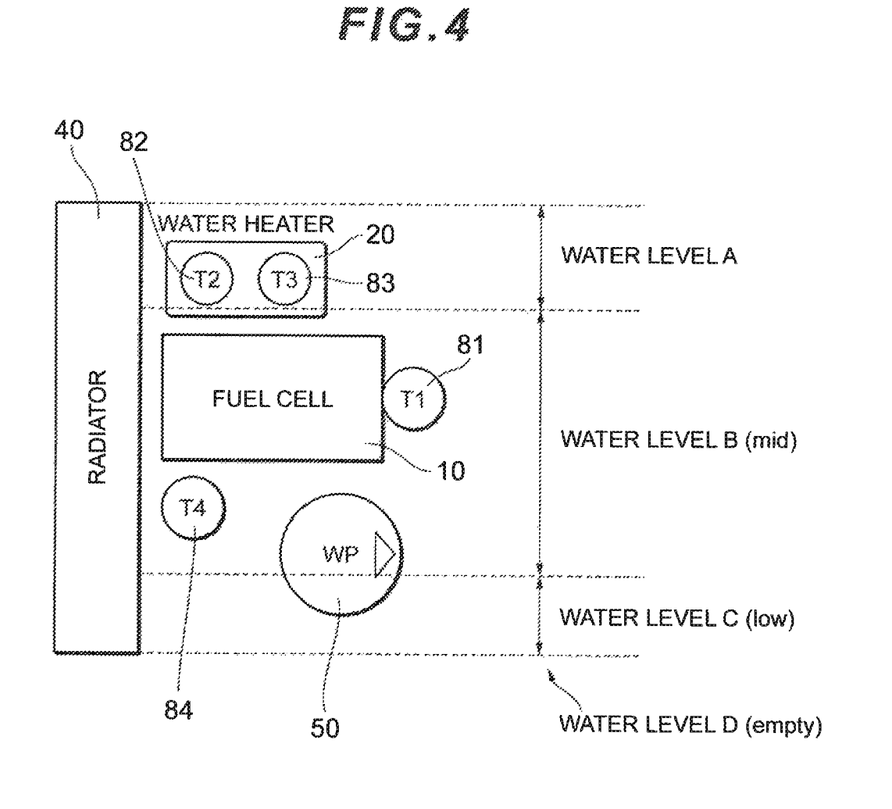
FIG. 4 is a side view of a fuel cell system according to a second embodiment, for explaining another example of the vertical arrangement of the water heater, fuel cell, etc., in the fuel cell system, as well as another example of the water level of the cooling water.

Referring now to FIG. 4, a fuel cell system 1 according to a second embodiment will now be described. In this fuel cell system 1, a fuel cell 10 is arranged at a position higher than a cooling water pump 50. Further, the first temperature sensor 81 is arranged at an almost equal level to the fuel cell 10, and the fourth temperature sensor 84 is arranged at a position lower than the fuel cell 10 but higher than the cooling water pump 50 (see FIG. 4).

The fuel cell system 1 having the above-described configuration, though a detailed description thereof is omitted, is able to make a determination as to which of the following:

Normal water level A (full): a normal water level which is above (or reaches) the level of the water heater 20;
Abnormal water level B (mid): an abnormal water level which is below the level of the water heater 20;
Abnormal water level C (low): a further abnormal water level which is below the level of the bottom surface of the fuel cell 10 and also below the level of the upper portion of the cooling water pump 50; and Abnormal water level D (empty): a most abnormal water level which is approximately zero corresponds to the water level of the cooling water that is circulating through the fuel cell system 1, in line with the mechanism and idea described above concerning the first embodiment.

Third Embodiment

In the above-described first embodiment, for the detection of a cooling water leakage, power generation by the fuel cell 10 is stopped (step SP4-2) if the result of the judgment in step SP4-1 is NO (if there is no temperature difference ΔT between measurement temperatures T2 and T3). However, on the contrary, the detection of a cooling water leakage can also be made without stopping the power generation by the fuel cell 10. An example of the determination of a water level without stopping the power generation by the fuel cell 10 will be described below (see FIG. 5). Since the content of steps SP11 through SP13, step SP16 and step SP19 is the same as such steps in the first embodiment, the description thereof will be omitted, and only steps SP14 through SP18 will be described here (see FIG. 5).

Figure 5:
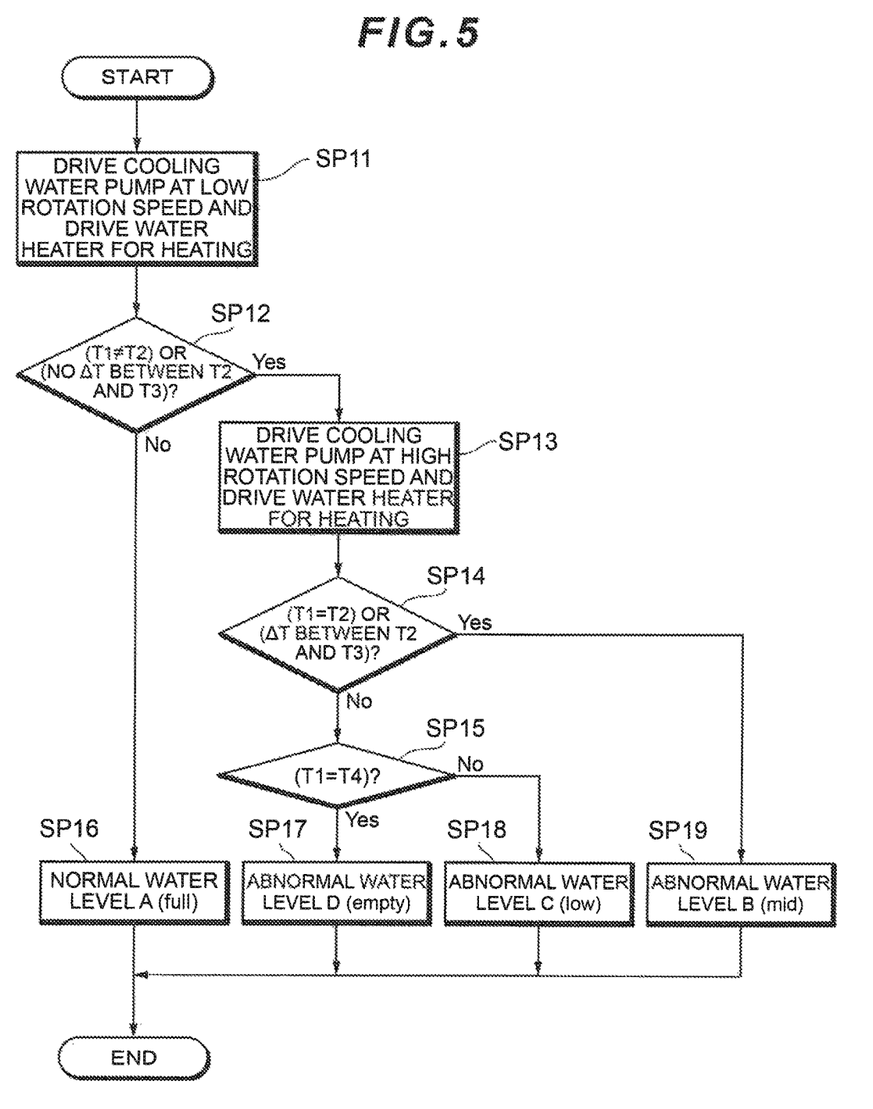
FIG. 5 is a flowchart showing an example of the process for determining the water level of the cooling water according to a third embodiment.

If the result of the judgment in step SP14 is NO, the process goes to step SP15, without stopping the power generation by the fuel cell 10. In step SP15, a judgment is made as to whether the condition "measurement temperature T1=measurement temperature T4" is met. If the result of the judgment in step SP15 is NO, this indicates that there is a temperature difference ΔT between measurement temperatures T1 and T4. In the presence of water, water flows through the fourth temperature sensor 84 toward the first temperature sensor 81. Since the fuel cell 10 exists between the first and fourth temperature sensors, the temperature of the water is raised in the fuel cell 10, thereby resulting in measurement temperatures T1 and T4 becoming different temperatures. In light of these results, the computer 70 determines that the cooling water in the fuel cell system 1 is at abnormal water level C (low), which is lower than, for example, the level of the fuel cell 10 but allows the cooling water to flow (step SP18), and ends the process for detecting a cooling water leakage.

On the other hand, if the result of the judgment in step SP15 is YES, this indicates that there is no temperature difference ΔT between measurement temperatures T1 and T4. In the absence of water, no water flows through the first temperature sensor 81 or the fourth temperature sensor 84, thereby resulting in measurement temperatures T1 and T4 becoming the same temperature. In light of these results, the computer 70 determines that the cooling water in the fuel cell system 1 is at abnormal water level D (empty) (step SP17), and ends the process for detecting a cooling water leakage.

The present invention is suited for use in fuel cell systems.

According to the present invention, a fuel cell system capable of identifying a cooling water leakage due to a failure of a radiator, etc., at an early stage is provided.

What is claimed is:

1. A fuel cell system having a fuel cell, the system comprising:
    a first temperature sensor that measures a temperature of cooling water on a cooling water outlet side of the fuel cell;
    a second temperature sensor that measures a temperature of the cooling water on a cooling water inlet side of a water heater that heats the cooling water;

a third temperature sensor that measures a temperature of the cooling water on a cooling water outlet side of the water heater;
a cooling water pump that circulates the cooling water; and
a control device that controls driving of the cooling water pump and the water heater by receiving measurement values from the first, second and third temperature sensors,
wherein the water heater and the second and third temperature sensors are arranged above in a direction of gravity relative to the cooling water pump and the first temperature sensor, and
wherein the control device is configured to determine that there is a cooling water leakage when a measurement temperature T1 measured by the first temperature sensor is not equal to a measurement temperature T2 measured by the second temperature sensor, or when the measurement temperature T2 and a measurement temperature T3 measured by the third temperature sensor have no temperature difference ΔT therebetween.

2. The fuel cell system according to claim 1, wherein the control device is configured to:
drive the cooling water pump at a higher rotation speed when the measurement temperature T1 is not equal to the measurement temperature T2 or when the measurement temperature T2 and the measurement temperature T3 have no temperature difference ΔT therebetween; and
determine that the cooling water is at a water level which is lower than the water heater but higher than the fuel cell and the cooling water pump, when the measurement temperature T1 is equal to the measurement temperature T2 or the measurement temperatures T2 and T3 have a temperature difference ΔT therebetween.

3. The fuel cell system according to claim 1, further comprising a radiator for the cooling water and a fourth temperature sensor that measures a temperature of the cooling water on a cooling water outlet side of the radiator, wherein the control device is configured to:
drive the cooling water pump at a higher rotation speed when the measurement temperature T1 is not equal to the measurement temperature T2 or when the measurement temperature T2 and the measurement temperature T3 have no temperature difference ΔT therebetween; and
determine that the cooling water is at a water level which is lower than the cooling water pump, when the measurement temperature T1 is not equal to the measurement temperature T2 and the measurement temperatures T2 and T3 have no temperature difference ΔT therebetween, and when the measurement temperature T1 is not equal to a measurement temperature T4 measured by the fourth temperature sensor.

4. The fuel cell system according to claim 1, further comprising a radiator for the cooling water and a fourth temperature sensor that measures a temperature of the cooling water on a cooling water outlet side of the radiator, wherein the control device is configured to:
drive the cooling water pump at a higher rotation speed when the measurement temperature T1 is not equal to the measurement temperature T2 or when the measurement temperature T2 and the measurement temperature T3 have no temperature difference ΔT therebetween; and
stop power generation by the fuel cell when the measurement temperature T1 is not equal to the measurement temperature T2 and the measurement temperatures T2 and T3 have no temperature difference ΔT therebetween, and thereafter determine that the water level of the cooling water is zero when the measurement temperature T1 is not equal to a measurement temperature T4 measured by the fourth temperature sensor.

5. The fuel cell system according to claim 1, further comprising a radiator for the cooling water and a fourth temperature sensor that measures a temperature of the cooling water on a cooling water outlet side of the radiator, wherein the control device is configured to:
drive the cooling water pump at a higher rotation speed when the measurement temperature T1 is not equal to the measurement temperature T2 or when the measurement temperature T2 and the measurement temperature T3 have no temperature difference ΔT therebetween; and
determine that the water level of the cooling water is zero when the measurement temperature T1 is not equal to the measurement temperature T2 and the measurement temperatures T2 and T3 have no temperature difference ΔT therebetween, and when the measurement temperature T1 is equal to a measurement temperature T4 measured by the fourth temperature sensor.

* * * * *